(12) United States Patent
Bongu Huma Shankar Rao et al.

(10) Patent No.: US 9,924,339 B2
(45) Date of Patent: Mar. 20, 2018

(54) REAL-TIME NOTIFICATION OF TOLL-FREE DATA SERVICE USAGE

(71) Applicant: Verizon Patent and Licensing Inc., Arlington, VA (US)

(72) Inventors: Fnu Bongu Huma Shankar Rao, Waltham, MA (US); Jian Huang, Sudbury, MA (US); Susan Kelly, Maynard, MA (US); Gong Zhang, Waltham, MA (US); Sayan Dey, Framingham, MA (US); Mohammad Zohaib Akmal, Framingham, MA (US); Guanrao Chen, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/225,313

(22) Filed: Aug. 1, 2016

(65) Prior Publication Data

US 2018/0035273 A1 Feb. 1, 2018

(51) Int. Cl.
*H04W 4/26* (2009.01)
*H04M 15/00* (2006.01)

(52) U.S. Cl.
CPC ............ *H04W 4/26* (2013.01); *H04M 15/09* (2013.01); *H04M 15/8214* (2013.01); *H04M 15/8353* (2013.01); *H04M 15/8355* (2013.01)

(58) Field of Classification Search
CPC ... H04M 2215/016; H04M 2215/0164; H04M 2203/2038; H04M 15/58; H04M 17/10; H04M 2215/22; H04M 2215/0188; H04M 3/2218; H04M 15/00; H04W 4/24; H04W 4/25; H04W 68/00; H04W 4/02; H04W 88/02; H04W 88/18; H04W 4/26; H04W 72/02; H04W 72/04; H04W 72/1257; H04Q 2213/13512; H04L 63/10; H04L 63/0823; H04L 65/10; H04L 65/1059
See application file for complete search history.

(56) References Cited

U.S. PATENT DOCUMENTS

| | | | | |
|---|---|---|---|---|
| 6,530,008 B1 * | 3/2003 | Lin | ................... | G06F 17/30321 711/171 |
| 6,574,661 B1 * | 6/2003 | Delano | ............... | G06F 11/0709 709/223 |
| 7,636,430 B2 * | 12/2009 | Lang | ................. | H04M 3/42306 379/218.01 |
| 2004/0213392 A1 * | 10/2004 | Crockett | ........... | H04M 3/42144 379/114.01 |
| 2012/0155380 A1 * | 6/2012 | Hodges | .................. | G06Q 30/00 370/328 |

(Continued)

*Primary Examiner* — Meless Zewdu (57) ABSTRACT

A device may receive first information. The first information may be based on traffic associated with usage of a toll-free data service. The device may receive an identifier for a user device. The user device may be using the toll-free data service. The device may generate second information. The second information may correspond to usage, by the user device, of the toll-free data service. The second information may be generated based on the first information and the identifier. The device may send the second information to another device to support providing a notification of toll-free data service usage. The notification of toll-free data service usage may be based on the second information.

20 Claims, 5 Drawing Sheets

(56) References Cited

U.S. PATENT DOCUMENTS

2015/0011180 A1* 1/2015 Buonomo ............... H04W 4/24
455/406
2017/0006451 A1* 1/2017 Mandanapu .......... H04L 43/028

* cited by examiner

REAL-TIME NOTIFICATION OF TOLL-FREE DATA SERVICE USAGE

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a content provider that sponsors the toll-free data service, rather than to an end user that uses the toll-free data service.

DETAILED DESCRIPTION OF PREFERRED EMBODIMENTS

The following detailed description of example implementations refers to the accompanying drawings. The same reference numbers in different drawings may identify the same or similar elements.

When a user device accesses content through a toll-free data service, a user of the user device is not charged for data usage associated with accessing the content. Instead, a third party (e.g., a content provider associated with the content) is charged for the data usage as a sponsor of the toll-free data service. However, at a time when the user device is accessing the content through the toll-free data service, the user might be unaware that the user is not being charged for the data usage. Rather, the user might not become aware of the toll-free data service usage until the user subsequently receives a bill that indicates the toll-free data service usage or that the user was not charged for the toll-free data service usage (e.g., at the end of a monthly or other billing period). Implementations described herein enable real-time notification of toll-free data service usage. As used herein, real-time notification of toll-free data service usage may include a notification of toll-free data service usage that is provided while a user is using the toll-free data service and/or within a threshold time period after a user has used the toll-free data service (e.g., within one minute, five minutes, ten minutes, one hour, or another suitable time period). Real-time notification of toll-free data service usage may enable a user and/or a user device to make content access decisions based on a contemporaneous awareness that content is being accessed via a toll-free data service.

Figure 1A:
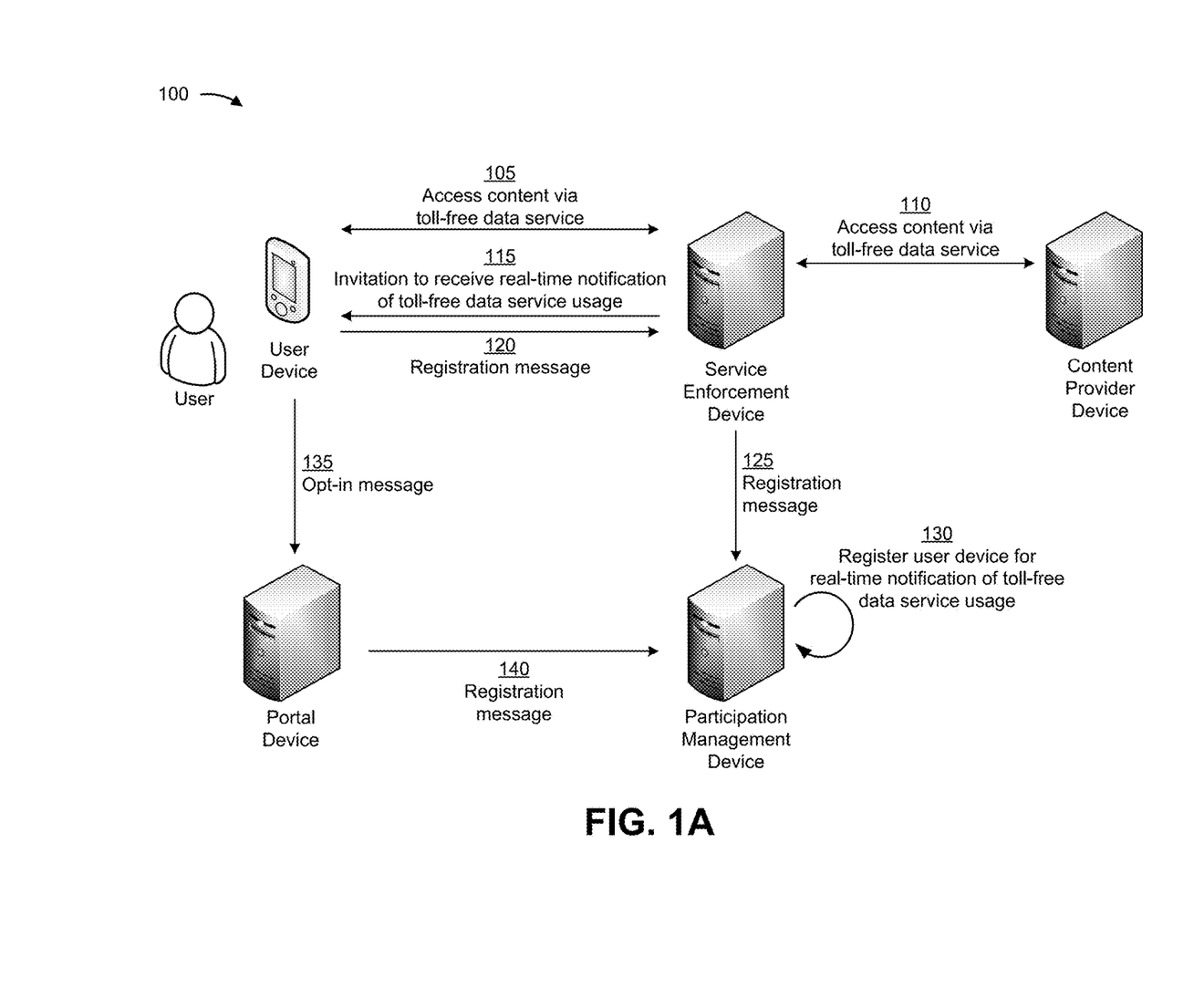
FIGS. 1A and 1B are diagrams of an overview of an example implementation described herein.
Figure 1B:
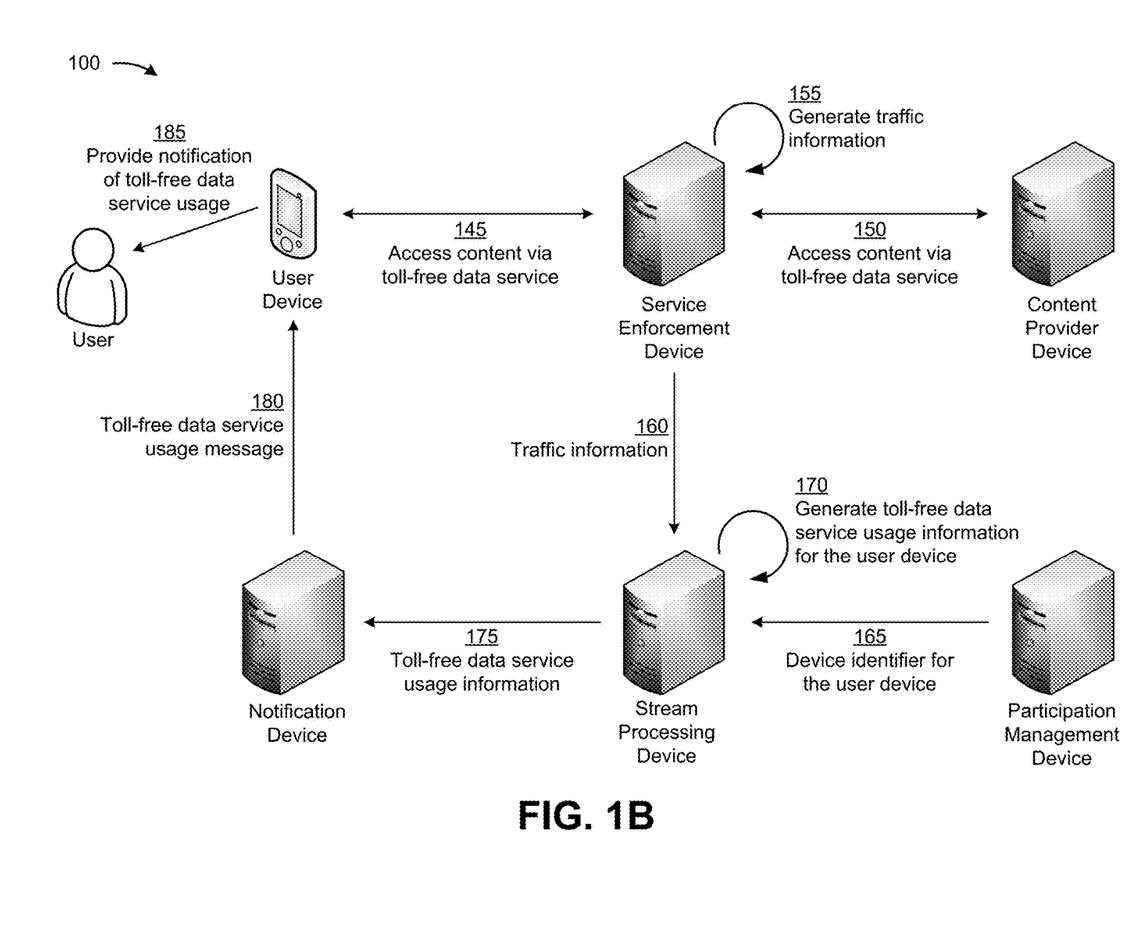

FIGS. 1A and 1B are diagrams of an overview of an example implementation 100 described herein. As shown in FIG. 1A, and by reference numbers 105 and 110, assume that a user is using a user device to access content from a content provider device. Further assume that the content is being accessed via a toll-free data service and traffic associated with accessing the content, via the toll-free data service, is being routed through a service enforcement device.

Based on the user device accessing content via the toll-free data service, and as shown by reference number 115, the service enforcement device may send the user device an invitation to receive real-time notification of toll-free data service usage. For example, the service enforcement device may send a message to the user device that causes the user device to display a notification (e.g., a web banner or the like) that includes information, instructions, and/or a link to a web page or application to enable the user and/or the user device to opt in for, and/or to opt out of, real-time notification of toll-free data service usage. For the purpose of FIG. 1A, assume that the user and/or the user device has decided to opt in for real-time notification of toll-free data service usage.

In some implementations, and based on the decision to opt in, software on the user device (e.g., an application (e.g., a mobile app), a library, an application programming interface (API), a software development kit (SDK), or the like) may cause the user device to send a registration message to the service enforcement device (as shown by reference number 120), which may forward the registration message to a participation management device (as shown by reference number 125). As shown by reference number 130, based on having received the registration message, the participation management device may register the user device for real-time notification of toll-free data service usage by storing a device identifier for the user device (e.g., a mobile device number (MDN), an international mobile subscriber identity (IMSI), a temporary mobile subscriber identity (TMSI), or the like) in a suitable data structure. In some implementations, the user device may send the registration message and/or the participation management device may register the user device while the user device is accessing content via the toll-free data service.

In some implementations, rather than opting in by sending a registration message to the service enforcement device, the user and/or the user device may retain the link to the web page or application for use at a later time. For the purpose of FIG. 1A, assume that the web page is associated with a portal (e.g., a self-service Internet-based portal or another type of portal), hosted by a portal device, through which the user and/or the user device may opt in for real-time notification of toll-free data service usage. Further assume that the user and/or the user device have opted in through the portal, which may cause the user device to send an opt-in message to the portal device (as shown by reference number 135). Based on receiving the opt-in message, the portal device may send a registration message to the participation management device (as shown by reference number 140), and the participation management device may register the user device for real-time notification of toll-free data service usage (as discussed above in connection with reference number 130).

As shown in FIG. 1B, and by reference numbers 145 and 150, assume that the user is using the user device to access content, from the content provider device, via a toll-free data service, with corresponding toll-free data service traffic (e.g., traffic associated with toll-free data service usage) being routed through the service enforcement device. Further assume that the participation management device has registered the user device for real-time notification of toll-free data service usage. As shown by reference number 155, the service enforcement device may generate traffic information based on the toll-free data service traffic being routed through the service enforcement device. The traffic information may include a device identifier for the user device, byte count information for the toll-free data service traffic, data usage information for the toll-free data service traffic, sponsor information identifying a sponsor for the toll-free data service, or the like. As shown by reference number 160, the service enforcement device may send the traffic information to a stream processing device.

As shown by reference number 165, based on receiving the traffic information, the stream processing device may obtain a device identifier for the user device from the participation management device. Based on receiving the traffic information and the device identifier, the stream processing device may generate toll-free data service usage information for the user device (as shown by reference number 170). In some implementations, the stream processing device may generate the toll-free data service usage information by filtering and aggregating the traffic information based on the device identifier.

Having generated the toll-free data service usage information, the stream processing device may send the toll-free data service usage information to a notification device (as shown by reference number 175). The notification device may then send, to the user device, a toll-free data service usage message based on the toll-free data service usage information (as shown by reference number 180). As shown by reference number 185, and based on receiving the toll-free data service usage message from the notification device, the user device may provide (e.g., for display) a notification of toll-free data service usage, in real-time (e.g., while the user device is accessing content via the toll-free data service and/or soon thereafter).

In this way, implementations described herein enable real-time notification of toll-free data service usage. Real-time notification of toll-free data service usage may enable a user and/or a user device to make content access decisions based on a contemporaneous awareness that content is being accessed via a toll-free data service. Enabling content access decisions based on a contemporaneous awareness that the content is being accessed via a toll-free data service may result in increased usage of a toll-free data service and/or increased traffic to a content provider device associated with the toll-free data service. Increased usage of a toll-free data service and/or increased traffic to a content provider device may enable more complete consumption of allocated network resources, allocated toll-free data service resources, and/or allocated content provider device resources.

As indicated above, FIGS. 1A and 1B are provided merely as an example. Other examples are possible and may differ from what was described with regard to FIGS. 1A and 1B.

Figure 2:
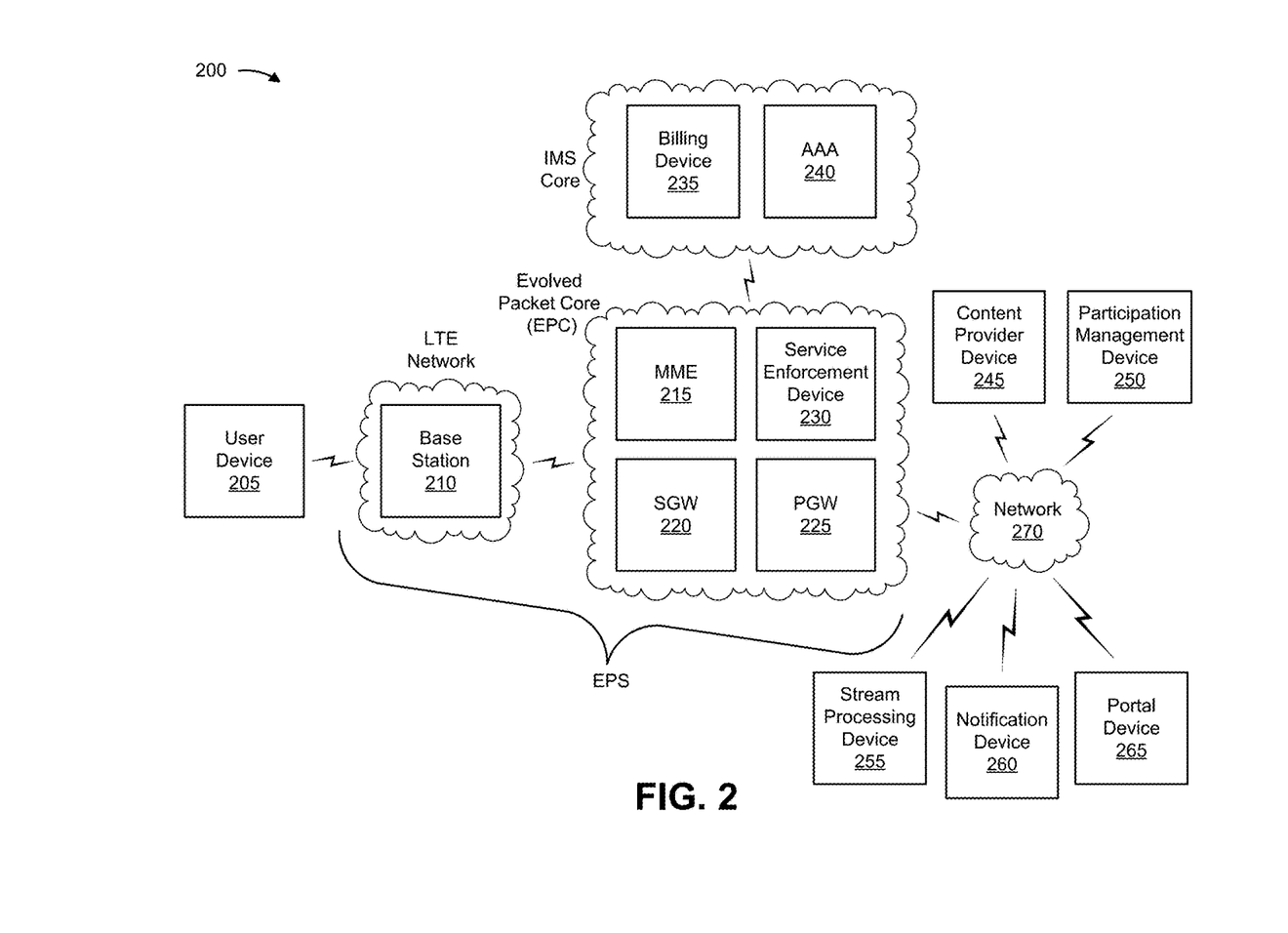
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a service enforcement device 230, a billing device 235, an authentication, authorization, and accounting server (AAA) 240, a content provider device 245, a participation management device 250, a stream processing device 255, a notification device 260, a portal device 265, and a network 270. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user devices 205 may communicate with the EPC. The EPC may include MME 215, SGW 220, PGW 225, and/or service enforcement device 230 that enable user device 205 to communicate with network 270 and/or an Internet protocol (IP) multimedia subsystem (IMS) core. The IMS core may include billing device 235 and/or AAA 240, and may manage device registration and authentication, session initiation, billing, or the like, associated with user device 205. Billing device 235 and/or AAA 240 may reside in the EPC and/or the IMS core.

User device 205 includes one or more devices capable of communicating with base station 210 and/or a network (e.g., network 270). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses or a smart watch), a machine device, and/or a similar device. User device 205 may send traffic to and/or receive traffic from network 270 (e.g., via base station 210, SGW 220, and/or PGW 225). In some implementations, user device 205 may include and/or receive suitable software (e.g., an application, a library, an API, an SDK, or the like) to support user device 205 interacting with service enforcement device 230, content provider device 245, participation management device 250, stream processing device 255, notification device 260, and/or portal device 265.

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 270 via SGW 220 and/or PGW 225. Additionally, or alternatively, one or more base stations 210 may be associated with a radio access network that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 270 (e.g., via PGW 225) and/or other network devices associated with the EPC and/or the IMS core. SGW 220 may also receive traffic from network 270 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 270. Additionally, or alternatively, PGW 225 may receive traffic from network 270, and may send the traffic to user device 205 via SGW 220 and base station 210. In some implementations, PGW 225 may record data usage information (e.g., byte usage), and may provide the data usage information to AAA 240.

In some implementations, PGW 225 may create a binding between an address for user device 205 (e.g., a network address, such as an IP address) and a device identifier for user device 205 (e.g., an MDN, an IMSI, a TMSI, or the like). In some implementations, the binding between the address of user device 205 and the device identifier of user device 205 may be included in pilot packets and may be stored in a suitable data structure. For example, the binding may be stored in a pilot packet database, a database that includes data from the IMS RF interface (e.g., data created from Diameter protocol messaging), or another suitable database that may store a mapping between the address of user device 205 and the device identifier of user device 205.

Service enforcement device 230 includes one or more devices capable of inspecting traffic and/or adding information to the traffic. For example, service enforcement device 230 may include a gateway, a router, a modem, a switch, a firewall, a NIC, a hub, a bridge, a server (e.g., a proxy server), an OADM, or a similar device. In some implementations, service enforcement device 230 may instruct AAA 240 and/or billing device 235 how to charge for data usage associated with the traffic. In some implementations, different service enforcement devices 230 may be associated with different geographic regions and/or cellular service areas.

In some implementations, service enforcement device 230 may be used to support a toll-free data service. For example, service enforcement device 230 may be used for toll-free data service traffic detection, byte counting, and/or traffic modification. For example, toll-free data service traffic (e.g., packets) may be routed from content provider device 245 to user device 205, via network 270, PGW 225, service enforcement device 230, PGW 225, SGW 220, and base station 210. In some implementations, toll-free data service traffic may be routed from user device 205 to content provider device 245, via base station 210, SGW 220, PGW 225, service enforcement device 230, PGW 225, and network 270.

In some implementations, service enforcement device 230 may generate traffic information based on packets being routed through service enforcement device 230 in connection with toll-free data service traffic to and/or from one or more user devices 205. In some implementations, service enforcement device 230 may send the traffic information to billing device 235 to support charging the sponsor for data usage associated with the toll-free data service. In some implementations, service enforcement device 230 may periodically send the traffic information to billing device 235 (e.g., hourly, daily, or based on another interval). In some implementations, service enforcement device 230 may additionally, or alternatively, send the traffic information to stream processing device 255 to support real-time notification of toll-free data service usage. In some implementations, service enforcement device 230 may send a message to user device 205 (e.g., when service enforcement device 230 is routing toll-free data service traffic to and/or from user device 205) to notify user device 205 that real-time notification of toll-free data service usage may be available.

Billing device 235 includes one or more devices, such as one or more server devices, capable of receiving, storing, generating, processing, aggregating, and/or providing usage and billing information associated with traffic to and/or from user device 205 and/or content provider device 245 (e.g., data usage by user device 205 and/or by content provider device 245). For example, billing device 235 may receive (e.g., from PGW 225, AAA 240, and/or service enforcement device 230) data usage information for user device 205 and/or for content provider device 245 in the context of user device 205 accessing content from content provider device 245.

In some implementations, billing device 235 may charge user device 205 for data usage associated with traffic to and/or from user device 205. Alternatively, billing device 235 may charge a sponsor of a toll-free data service for data usage associated with traffic to and/or from user device 205 (e.g., traffic associated with user device 205 accessing content from content provider device 245 via a toll-free data service). For example, billing device 235 may charge a sponsor of a toll-free data service for data usage associated with traffic to and/or from user device 205 based on traffic information billing device 235 received from service enforcement device 230.

AAA 240 includes one or more devices, such as one or more server devices, that perform authentication, authorization, and/or accounting operations for communication sessions associated with user device 205. For example, AAA 240 may store data usage information for user device 205, for a user associated with user device 205, for content provider device 245, for a content provider (e.g., that provides and/or supports content associated with content provider device 245), a sponsor of a toll-free data service, or the like.

Content provider device 245 includes one or more devices capable of providing content (e.g., to user device 205). For example, content provider device 245 may include a server device (e.g., a host server, a web server, an application server, etc.) or a similar device. In some implementations, content provider device 245 may be associated with a content provider that sponsors a toll-free data service, where the content provider is charged for data usage associated with the toll-free data service rather than an end user associated with user device 205.

Participation management device 250 includes one or more devices capable of managing participation for real-time notification of toll-free data service usage. For example, participation management device 250 may include a computing device (e.g., a desktop computer, a laptop computer, a tablet computer, a handheld computer, a server computer, a smart phone, a gaming device, a computer cluster, a cloud computer, or the like). In some implementations, participation management device 250 may support an opt-in process and/or an opt-out process that may allow users and/or user devices to opt-in and/or opt-out of real-time notification of toll-free data service usage. For example, participation management device 250 may register user device 205 for real-time notification of toll-free data service usage. In some implementations (e.g., when user device 205 has registered for real-time notification of toll-free data service usage), participation management device 250 may send, to stream processing device 255, a device identifier for user device 205.

Stream processing device 255 includes one or more devices capable of receiving, generating, storing, processing, aggregating, filtering, and/or providing information associated with data usage (e.g., traffic information, toll-free data service usage information, or the like). For example, stream processing device 255 may include a computing device (e.g., a desktop computer, a laptop computer, a tablet computer, a handheld computer, a server computer, a smart phone, a gaming device, a computer cluster, a cloud computer, or the like). In some implementations, stream processing device 255 may receive traffic information from service enforcement device 230 and/or may receive a device identifier (e.g., for user device 205) from participation management device 250. In some implementations, stream processing device 255 may additionally generate toll-free data service usage information based on the traffic information and/or the device identifier and send the toll-free data service usage information to notification device 260.

Notification device 260 includes one or more devices capable of receiving, generating, storing, processing, and/or providing information and sending a message to user device 205. For example, notification device 260 may include a computing device (e.g., a desktop computer, a laptop computer, a tablet computer, a handheld computer, a server computer, a smart phone, a gaming device, a computer cluster, a cloud computer, or the like). In some implementations, the message may be a push notification, the sending of which was initiated by another device or server (e.g., by service enforcement device 230, by billing device 235, by content provider device 245, by participation management device 250, by stream processing device 255, and/or by portal device 265). In some implementations, the message may be a short message service (SMS) message. In some implementations, notification device 260 may receive, from stream processing device 255, toll-free data service usage information for user device 205. In some implementations, notification device 260 may generate and send, to user device 205, a toll-free data service usage message based on the toll-free data service usage information received from stream processing device 255. In some implementations, notification device 260 may process (e.g., filter, aggregate, summarize, and/or analyze) the toll-free data service usage information prior to sending the toll-free data service usage message to user device 205.

Portal device 265 includes one or more devices capable of receiving, generating, processing, storing, and/or providing information associated with user device 205 opting in to and/or opting out of real-time notification of toll-free data service usage. For example, portal device 265 may include a server device (e.g., a host server, a web server, an application server, etc.) or a similar device. In some implementations, portal device 265 may host an application (e.g., a web portal or another type of a self-service application) associated with opting in to and/or opting out of real-time notification of toll-free data service usage.

Network 270 includes one or more wired and/or wireless networks. For example, network 270 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
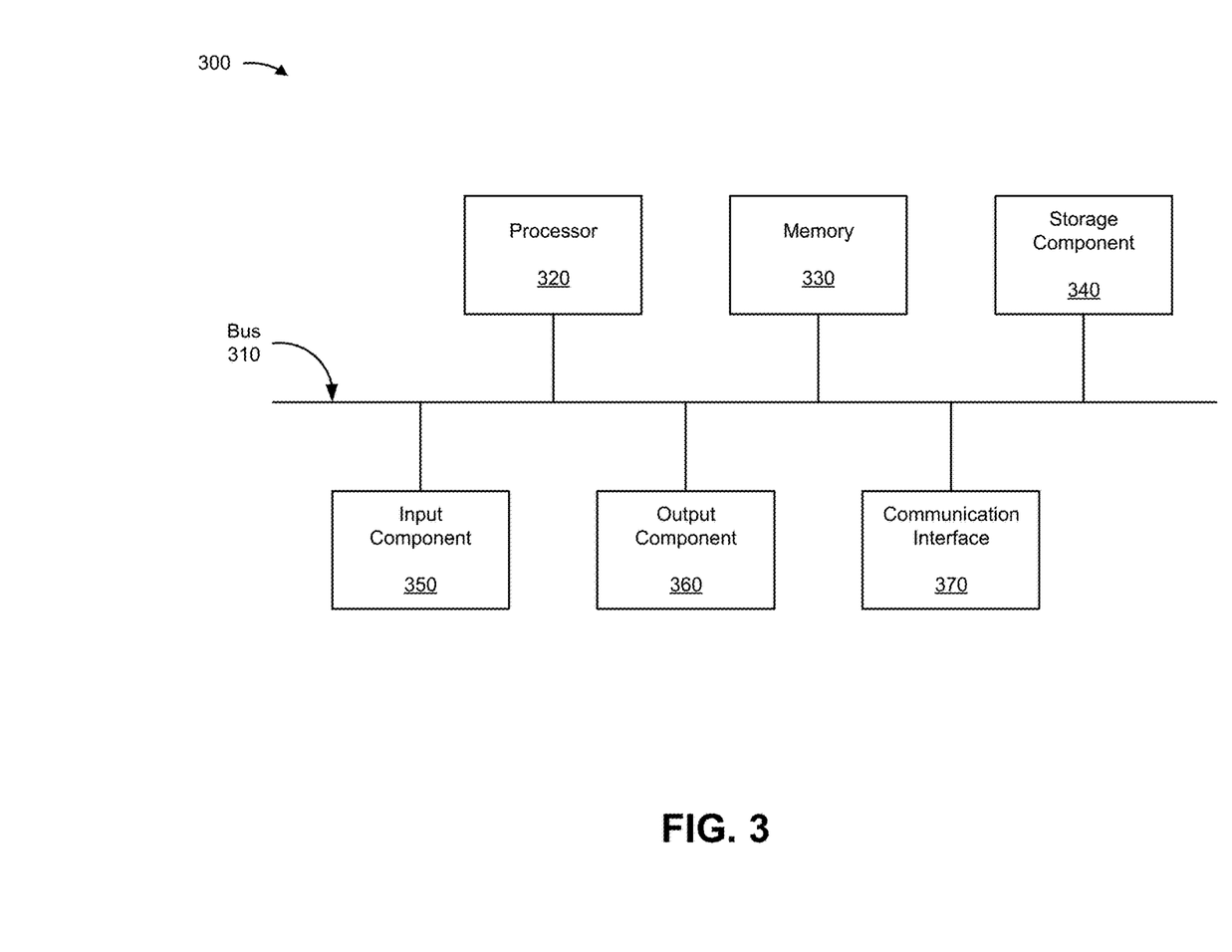
FIG. 3 is a diagram of example components of one or more devices of FIG. 2.

FIG. 3 is a diagram of example components of a device 300. Device 300 may correspond to user device 205, base station 210, MME 215, SGW 220, PGW 225, service enforcement device 230, billing device 235, AAA 240, content provider device 245, participation management device 250, stream processing device 255, notification device 260, and/or portal device 265. In some implementations, user device 205, base station 210, MME 215, SGW 220, PGW 225, service enforcement device 230, billing device 235, AAA 240, content provider device 245, participation management device 250, stream processing device 255, notification device 260, and/or portal device 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
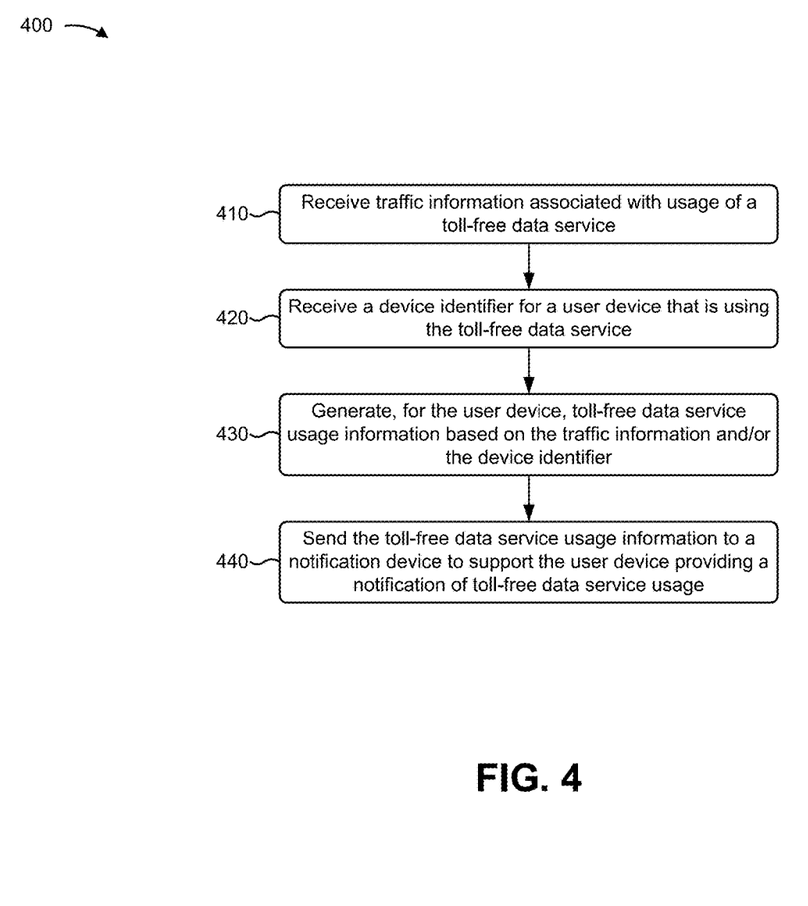
FIG. 4 is a flow chart of an example process for real-time notification of toll-free data service usage.

FIG. 4 is a flow chart of an example process 400 for real-time notification of toll-free data service usage. In some implementations, one or more process blocks of FIG. 4 may be performed by stream processing device 255. In some implementations, one or more process blocks of FIG. 4 may be performed by another device or a group of devices separate from or including stream processing device 255, such as user device 205, base station 210, MME 215, SGW 220, PGW 225, service enforcement device 230, billing device 235, AAA 240, content provider device 245, participation management device 250, notification device 260, and/or portal device 265.

As shown in FIG. 4, process 400 may include receiving traffic information associated with usage of a toll-free data service (block 410). For example, stream processing device 255 may receive traffic information associated with usage of a toll-free data service.

In some implementations, the traffic information may include at least one traffic information record that is based on traffic associated with usage of the toll-free data service by one or more user devices 205 (e.g., one or more user devices 205 that are sending and/or receiving toll-free data service traffic). The traffic information record may include a device identifier for one or more user devices 205 that are using the toll-free data service, byte count information for the toll-free data service traffic, data usage information for the toll-free data service traffic, sponsor information identifying a sponsor for the toll-free data service, or the like. In some implementations, the traffic information may include multiple traffic information records, each of which may correspond to one or more packets within the toll-free data service traffic.

In some implementations, service enforcement device 230 may generate the traffic information records for the traffic information. For example, service enforcement device 230 may generate a traffic information record based on toll-free data service traffic (e.g., packets) being routed through service enforcement device 230 in connection with usage of the toll-free data service by one or more user devices 205. In some implementations, service enforcement device 230 may generate a traffic information record based on information (e.g., a source address, a destination address, a packet length, or the like) associated with a packet of toll-free data service traffic that is being routed through service enforcement device 230. In some implementations, service enforcement device 230 may generate a traffic information record based on all toll-free data service traffic that is being routed through service enforcement device 230. In some implementations, service enforcement device 230 may generate a traffic information record based on less than all of the toll-free data service traffic that is being routed through service enforcement device 230, thereby conserving processor and/or memory resources.

In some implementations, service enforcement device 230 may determine, for a traffic information record, a device identifier (e.g., an MDN, an IMSI, a TMSI, or the like) for one or more user devices 205 that are using a toll-free data service based on an address associated with a packet (e.g., a source address and/or destination address) sent and/or received by user device 205 in connection with usage of the toll-free data service. For example, service enforcement device 230 may determine a device identifier for one or more user devices 205 based on the address associated with the packet and a binding, created by PGW 225, between an address for user device 205 and a device identifier for user device 205.

In some implementations, stream processing device 255 may receive the traffic information from service enforcement device 230. For example, service enforcement device 230 may send the traffic information to stream processing device 255 based on service enforcement device 230 having generated the traffic information.

As further shown in FIG. 4, process 400 may include receiving a device identifier for a user device that is using the toll-free data service (block 420). For example, stream processing device 255 may receive a device identifier (e.g., an MDN, an IMSI, a TMSI, or the like) for user device 205, which may be using the toll-free data service. In some implementations, user device 205 may be using the toll-free data service to access content from a sponsor of the toll-free data service (e.g., from content provider device 245), to obtain services from the sponsor of the toll-free data service, to send and/or receive toll-free data service traffic, or the like.

In some implementations, stream processing device 255 may receive the device identifier from participation management device 250. For example, based on receiving the traffic information, stream processing device 255 may request, from participation management device 250, a device identifier for one or more user devices 205. Based on receiving the request from stream processing device 255, participation management device 250 may send, to stream processing device 255, a device identifier for one or more user devices 205.

In some implementations, stream processing device 255 may request a device identifier for one or more user devices 205 that are registered for real-time notification of toll-free data service usage (hereinafter "registered," "register," or "registering"). For example, stream processing device 255 may request a device identifier associated with one or more user devices 205 that are registered. Alternatively, stream processing device 255 may determine one or more user devices 205 that have used the toll-free data service (e.g., based on a traffic information record that includes a device identifier for user device 205). Stream processing device 255 may then request a device identifier associated with one or more user devices 205 that have both used the toll-free data service and are also registered.

In some implementations, participation management device 250 may have registered one or more user devices 205 prior to stream processing device 255 requesting a device identifier. For example, participation management device 250 may register user device 205 based on user device 205 opting in for real-time notification of toll-free data service usage. In some implementations, participation management device 250 may register user device 205 by storing a device identifier and/or other information for user device 205 in a suitable data structure (e.g., an opt-in database or the like).

In some implementations, participation management device 250 may refrain from registering user device 205 when user device 205 opts out of real-time notification of toll-free data service usage. In some implementations, participation management device 250 may refrain from registering user device 205 based on user device 205 having not opted in for real-time notification of toll-free data service usage (e.g., user device 205 may opt out by not affirmatively opting in). In some implementations (e.g., where user device 205 has opted out and/or has not opted in), participation management device 250 may store a device identifier for user device 205 in a suitable data structure (e.g., an opt-out database or the like).

Although described in the context of user device 205 opting in, opting out, and/or being registered, the implementations described herein may also be applicable to a user of user device 205 opting in, opting out, and/or being registered. For example, input from a user may cause user device 205 to opt in, opt out, and/or be registered. Alternatively, software on user device 205 may cause user device 205 to opt in, opt out, and/or be registered (e.g., without input from a user). Thus, references herein to user device 205 opting in, opting out, and/or being registered should be understood as additionally, or alternatively, referring to a user interacting with user device 205 to opt in, opt out, and/or register.

In some implementations, user device 205 may opt in for, or opt out of, real-time notification of toll-free data service usage (hereinafter "opt in or opt out," "opted in or opted out," or "opting in or opting out") based on an invitation message received by user device 205. In some implementations, the invitation message may include information regarding real-time notification of toll-free data service usage, instructions for user device 205 to opt in or opt out, and/or a link for a web page (e.g., a uniform resource locator (URL) or another address) or another type of application. In some implementations, the invitation message may cause user device 205 to display a notification (e.g., a web banner or the like) that includes the information, the instructions, and/or the link for the web page. While described in the context of a web page, another type of application may be used in some implementations.

In some implementations, user device 205 may obtain the information and/or the instructions from the web page. In some implementations, the web page may be associated with a suitable portal (e.g., a self-service Internet-based portal or another type of portal), through which user device 205 may opt in or opt out (as discussed below).

In some implementations, user device 205 may receive the invitation message while user device 205 is using a toll-free data service. For example, service enforcement device 230 may send the invitation message to user device 205 while user device 205 is accessing content via the toll-free data service. In some implementations, user device 205 may receive the invitation message based on user device 205 having previously used a toll-free data service. In some implementations, user device 205 may receive the invitation message based on real-time notification of toll-free data service usage being available to user device 205.

In some implementations, user device 205 may use suitable software on user device 205 (e.g., an application, a library, an API, an SDK, or the like) to opt in or opt out. In some implementations, the software on user device 205 may cause user device 205 to send a registration message to service enforcement device 230. The registration message may indicate whether user device 205 has opted in or opted out. Service enforcement device 230 may forward the registration message to participation management device 250. When the registration message indicates that user device 205 has opted in, participation management device 250 may register user device 205 (as discussed above) based on receiving the registration message. In some implementations, user device 205 may send the registration message to service enforcement device 230 and/or service enforcement device 230 may send the registration message to participation management device 250 while user device 205 is using the toll-free data service. In some implementations, user device 205 and/or service enforcement device 230 may send the registration message when user device 205 is not currently using the toll-free data service.

In some implementations, user device 205 may opt in or opt out through the portal by accessing a web page, associated with the portal, based on the link in the invitation message. In some implementations, the portal and/or the web page may be hosted by portal device 265. Alternatively, the portal and/or the web page may be hosted by participation management device 250 and/or content provider device 245. Based on user device 205 opting in or opting out through the portal, portal device 265, service enforcement device 230, and/or another device may send a registration message to service enforcement device 230 to indicate whether user device 205 has opted in or opted out. When the registration message indicates that user device 205 has opted in, participation management device 250 may register user device 205 (as discussed above) based on receiving the registration message.

In some implementations, user device 205 may opt in or opt out through the portal while user device 205 is using the toll-free data service. Alternatively, user device 205 may opt in or opt out through the portal at a later time (e.g., when user device 205 is not using the toll-free data service). For example, user device 205 and/or a user of user device 205 may retain (e.g., store, record, or the like) the link from the invitation message such that user device 205 may access the portal at a later time.

As further shown in FIG. 4, process 400 may include generating, for the user device, toll-free data service usage information based on the traffic information and/or the device identifier (block 430). For example, stream processing device 255 may generate toll-free data service usage information for user device 205. In some implementations, the toll-free data usage information may include a device identifier associated with user device 205, identity information for a sponsor of a toll-free data service being used by user device 205, information indicating that user device 205 is using a toll-free data service, information indicating that a toll-free data service may be available for use by user device 205, information indicating a time when a toll-free data service may be available for use by user device 205, information regarding content that user device 205 is receiving and/or accessing via a toll-free data service, information regarding a quantity of toll-free data service usage by user device 205 (e.g., a byte count or another measure of data usage), information regarding a quantity of toll-free data service usage that may be available for user device 205, or the like.

In some implementations, stream processing device 255 may generate the toll-free data service usage information, for user device 205, based on the traffic information and/or a device identifier. For example, stream processing device 255 may generate the toll-free data usage information based on filtered traffic information and/or aggregated traffic information.

In some implementations, stream processing device 255 may create filtered traffic information by filtering the traffic information based on at least one device identifier. For example, stream processing device 255 may filter the traffic information based on a device identifier for user device 205 that is registered with participation management device 250 (e.g., to exclude traffic information associated with a device identifier for another user device 205 that is not registered with participation management device 250). In such an example, the filtered traffic information may include at least one traffic information record corresponding to the device identifier for user device 205 that is registered with participation management device 250 (e.g., a user device 205 that has opted in). In some implementations, stream processing device 255 may filter the traffic information based on one or more preselected device identifiers (e.g., one or more device identifiers for a subset of user devices 205 that are registered with participation management device 250).

In some implementations, stream processing device 255 may generate the toll-free data usage information based on aggregating filtered traffic information that corresponds to a device identifier. By aggregating filtered traffic information, stream processing device 255 may generate toll-free data service usage information for user device 205 based on whether user device 205 is registered with participation management device 250 (e.g., whether user device 205 has opted in). Generating toll-free data service usage information for a user device 205 that is registered may reduce consumption of processor and/or network resources that might otherwise be consumed by indiscriminately generating toll-free data service usage information for all user devices 205 that have used a toll-free data service.

In some implementations, stream processing device 255 may create aggregated traffic information by aggregating traffic information that corresponds to a device identifier. For example, stream processing device 255 may aggregate one or more traffic information records that correspond to a device identifier associated with user device 205 to create aggregated traffic information for user device 205. In some implementations, stream processing device 255 may aggregate traffic information for each user device 205 that is registered with participation management device 250 to create aggregated traffic information for each registered user device 205 (e.g., for each user device 205 that has opted in). In some implementations, stream processing device 255 may aggregate traffic information for each user device 205 to create aggregated traffic information for each user device 205. In some implementations, stream processing device 255 may generate the toll-free data usage information based on filtering the aggregated traffic information.

In some implementations, the toll-free data usage information for user device 205 may include at least one traffic information record corresponding to the device identifier for the user device 205. In some implementations, the toll-free data usage information for user device 205 may include information regarding a quantity of toll-free data service usage by user device 205 (e.g., a byte count or another measure of data usage). For example, when aggregating filtered traffic information for user device 205, stream processing device 255 may aggregate quantity information from one or more traffic information records that correspond to toll-free data service usage by user device 205 to determine a total quantity of toll-free data service usage by user device 205.

As further shown in FIG. 4, process 400 may include sending the toll-free data service usage information to a notification device to support the user device providing a notification of toll-free data service usage (block 440). For example, stream processing device 255 may send the toll-free data service usage information to notification device 260.

Sending the toll-free data usage information to notification device 260 may support user device 205 providing a notification of toll-free data service usage. For example, based on receiving the toll-free data service usage information from stream processing device 255, notification device 260 may send a toll-free data service usage message to user device 205. In some implementations, notification device 260 may send the toll-free data service usage message to user device 205 based on a device identifier, for user device 205, included in the toll-free data usage information. In some implementations, notification device 260 may send the toll-free data service usage message to user device 205 as a push notification, an SMS message, or the like. In some implementations, the toll-free data service usage message may include some or all of the toll-free data usage information described above.

In some implementations, notification device 260 may send a toll-free data service usage message to a user device 205 that is registered with participation management device 250 (e.g., a user device 205 that has opted in). Sending a toll-free data service usage message to a user device 205 that is registered may reduce consumption of processor and/or network resources that might otherwise be consumed by indiscriminately sending a toll-free data service usage message to all user devices 205 that have used a toll-free data service.

In some implementations, the toll-free data service usage message sent to user device 205 may support providing notification of toll-free data service usage. For example, based on receiving the toll-free data service usage message from notification device 260, user device 205 may provide a notification, to a user of user device 205, that user device 205 is receiving and/or has received toll-free data service traffic. In some implementations, the notification may include a visible indication (e.g., provide for display) and/or an audible indication (e.g., a recorded message or the like) that includes some or all of the toll-free data usage information.

In some implementations, notification device 260 may analyze the toll-free data service usage information prior to sending the toll-free data service usage message to user device 205. For example, when user device 205 is receiving multiple toll-free data service streams, notification device 260 may summarize and/or aggregate toll-free data service usage information, for multiple toll-free data service streams, into a toll-free data service usage message. By summarizing and/or aggregating the toll-free data service usage information, notification device 260 may adjust a rate and/or frequency of sending a toll-free data service usage message to user device 205. Adjusting the rate and/or frequency with which notification device 260 sends a toll-free data service usage message to user device 205 may prevent sending a toll-free data service usage message too frequently and/or may reduce delays in sending user device 205 a toll-free data service usage message.

To support providing real-time notification of toll-free data service usage, one or more process blocks of process 400 may, in some implementations, be performed while user device 205 is using a toll-free data service. In some implementations, process 400 may be performed, in its entirety, while user device 205 is using a toll-free data service. Alternatively, one or more process blocks of process 400 may be performed after user device 205 has used a toll-free data service. For example, one or more process blocks of process 400 may be performed upon conclusion of user device 205 using a toll-free data service and/or before expiration of a suitable time period after user device 205 has used the toll-free data service (e.g., one minute, five minutes, ten minutes, one hour, or another suitable time period). In some implementations, process 400 may be performed, in its entirety, after user device 205 has used a toll-free data service. For example, process 400 may be performed, in its entirety, upon conclusion of user device 205 using a toll-free data service and/or within a suitable time period after user device 205 has used the toll-free data service. In other words, one or more process blocks of process 400 may be performed in real time and/or in near-real time to support providing real-time notification of toll-free data service usage.

Based on the toll-free data service usage message and/or the notification, user device 205 and/or a user of user device 205 may determine when content is being accessed via a toll-free data service and/or what content may be available via a toll-free data service. Being able to determine when content is being accessed via a toll-free data service and/or what content may be available via a toll-free data service may encourage accessing content that is available via a toll-free data service and/or use of the toll-free data service, which may increase consumption of resources that have been allocated to provide the toll-free data service and/or may increase access to content that may be accessed via the toll-free data service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, implementations described herein may enable real-time notification of toll-free data service usage. Real-time notification of toll-free data service usage may enable a user and/or a user device to make content access decisions based on a contemporaneous awareness that the user device and/or the user are not being charged for data usage associated with accessing the content due to the toll-free data service. Enabling content access decisions based on a contemporaneous awareness that the user device and/or the user are not being charged for data usage associated with accessing the content may result in increased usage of a toll-free data service and/or increased traffic to a content provider device associated with the toll-free data service. Increased usage of a toll-free data service and/or increased traffic to a content provider device may enable more complete consumption of allocated network resources, allocated toll-free data service resources, and/or allocated content provider device resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   on or more memories; and
   one or more processors, communicatively coupled to the one or more memories to:
   receive traffic information,
   the traffic information being based on traffic associated with usage of a toll-free data service,
   the traffic information including a plurality of records, each of the plurality of records including a second identifier;
   receive a first identifier for a user device, the user device using the toll-free data service;
   filter the plurality of records to create filtered traffic information, the plurality of records being filtered based on comparing the second identifier, for each of the plurality of records, and the first identifier: generate usage information,
   the usage information corresponding to usage, by the user device, of the toll-free data service, and
   the usage information being generated based on the filtered traffic information;
   first information and the identifier; and
   send the usage information to another device to support providing a notification of the toll-free data service usage to the user device,
   the notification of the toll-free data service usage being based on the usage information.

2. The device of claim 1, where the one or more processors, when generating the usage information, are to:
   generate the usage information by aggregating the plurality of records.

3. The device of claim 1, where the usage information includes byte count information for the usage, by the user device, of the toll-free data service.

4. The device of claim 1, where the one or more processors, when sending the usage information to the other device, are to:
   send the usage information to the other device while the user device is using the toll-free data service.

5. The device of claim 1, where the one or more processors, when receiving the traffic information, are to:
   receive the traffic information while the user device is using the toll-free data service.

6. The device of claim 1, where the one or more processors, when receiving the traffic information, are to:
   receive the traffic information while the user device is using the toll-free data service; and
   where the one or more processors, when sending the usage information to the other device, are to:
   send the usage information to the other device within a threshold time period after the user device has used the toll-free data service.

7. The device of claim 1, where the first identifier for the user device is based on the user device being registered for the notification of toll-free data service usage.

8. A non-transitory computer-readable medium storing instructions, the instructions comprising:
   one or more instructions that, when executed by one or more processors, cause the one or more processors to:
   receive a first device identifier for a user device, the user device receiving traffic via a toll-free data service;
   receive traffic information, the traffic information being associated with usage of the toll-free data service, the traffic information including a plurality of records, each of the plurality of records including a second device identifier;
   filter the plurality of records to create filtered traffic information, the plurality of records being filtered based on comparing the second device identifier, for each of the plurality of records, and the first device identifier;
   generate, for the user device, usage information based on the filtered traffic information and the usage information corresponding to usage, by the user device, of the toll-free data service; and
   send the usage information to a notification device to support providing a notification of the toll-free data service usage to the user device,
   the notification of the toll-free data service usage being based on the usage information.

9. The non-transitory computer-readable medium of claim 8, where the one or more instructions, that cause the one or more processors to receive the traffic information, cause the one or more processors to:
   receive the traffic information while the user device is receiving the traffic via the toll-free data service.

10. The non-transitory computer-readable medium of claim 8, where the one or more instructions, that cause the one or more processors to send the usage information to the notification device, cause the one or more processors to:
    send the usage information to the notification device within a threshold time period after the user device has received the traffic via the toll-free data service.

11. The non-transitory computer-readable medium of claim 8, where the one or more instructions, when executed by the one or more processors, further cause the one or more processors to:
    aggregate the plurality of records to create aggregated traffic information before generating the usage information; and
    where the one or more instructions, that cause the one or more processors to generate the usage information, cause the one or more processors to:
    generate the usage information based on the aggregated traffic information.

12. The non-transitory computer-readable medium of claim 8,
    where the one or more instructions, that cause the one or more processors to generate the usage information, cause the one or more processors to:
    generate the usage information based on aggregating the filtered traffic information.

13. The non-transitory computer-readable medium of claim 8, where the one or more instructions, that cause the one or more processors to receive the first device identifier for the user device, cause the one or more processors to:
    receive the first device identifier for the user device based on the user device being registered for the notification of the toll-free data service usage.

14. The non-transitory computer-readable medium of claim 8, where the usage information includes byte count information for the usage, by the user device, of the toll-free data service.

15. A method, comprising:
    receiving, by a device, traffic information, the traffic information being received based on a user device accessing content via a toll-free data service, the traffic information including a plurality of records, each of the plurality of records including a second identifier, and the first information being associated with usage of the toll-free data service;
    receiving, by the device, a first identifier for the user device;
    filtering, by the device, the plurality of records to create filtered traffic information, the plurality of records being filtered based on comparing the second identifier, for each of the plurality of records, and the first identifier;
    generating, by the device and for the user device, usage information,
    the usage information corresponding to usage of the toll-free data service by the user device, and
    the usage information being generated based on the filtered traffic information; and
    sending, by the device, the usage information to another device to support providing a notification of the toll-free data service usage to the user device,
    the notification of the toll-free data service usage including the usage information.

16. The method of claim 15, further comprising:
    aggregating the filtered traffic information to create aggregated traffic information before generating the usage information; and
    where generating the usage information comprises:
    generating the usage information based on the aggregated traffic information.

17. The method of claim 15, where receiving the first identifier for the user device comprises:
    receiving the first identifier for the user device based on the user device having opted in for the notification of the toll-free data service usage.

18. The method of claim 15, where receiving the traffic information comprises:
    receiving the traffic information while the user device is accessing the content via the toll-free data service.

19. The method of claim 15, where sending the usage information to the other device comprises:
    sending the usage information to the other device before expiration of a time period after the user device has accessed the content via the toll-free data service.

20. The method of claim 15, where the usage information includes byte count information for the usage, by the user device, of the toll-free data service.

* * * * *